| United States Patent [19] | [11] Patent Number: 5,066,331 |
| Hutter | [45] Date of Patent: Nov. 19, 1991 |

[54] WATER-SOLUBLE ROSIN POLYAMIDE RESINS

[75] Inventor: G. Frederick Hutter, Charleston, S.C.

[73] Assignee: Westvaco Corporation, New York, N.Y.

[21] Appl. No.: 454,416

[22] Filed: Dec. 21, 1989

[51] Int. Cl.$^5$ ............................................. C09D 11/08
[52] U.S. Cl. ................................... 106/30; 106/20; 106/500; 530/210; 530/211; 530/221
[58] Field of Search .......................................... 106/30

[56] References Cited

U.S. PATENT DOCUMENTS

| | | | |
|---|---|---|---|
| 3,637,638 | 1/1972 | Sloan | 106/30 |
| 3,896,064 | 7/1975 | Koishi et al. | 106/30 |
| 4,536,468 | 8/1985 | Yasui et al. | 427/44 |
| 4,963,188 | 10/1990 | Parker | 106/30 |

*Primary Examiner*—William R. Dixon, Jr.
*Assistant Examiner*—Margaret V. Einsmann
*Attorney, Agent, or Firm*—Terry B. McDaniel; Daniel B. Reece, IV; Richard L. Schmalz

[57] ABSTRACT

A water-soluble resin for packaging ink comprising the reaction product of fumarated or maleated rosin and a compound containing two secondary amine groups is disclosed. A resin with a higher softening point may be obtained by substituting a dicarboxylic acid, such as adipic acid or isophathalic acid, for part of the fumarated or maleated rosin. Water varnishes, pigment bases, and water based inks containing the resin are disclosed.

29 Claims, No Drawings

WATER-SOLUBLE ROSIN POLYAMIDE RESINS

BACKGROUND OF THE INVENTION

(1) Field of the Invention

This invention relates to a novel water-soluble resin. In particular, this invention relates to a water-soluble resin for packaging ink, derived from the reaction product of a modified rosin and a bis (secondary amine) such as piperazine.

(2) Description of Prior Art

Resin used as a vehicle for water based packaging ink must exhibit properties such as solubility in water, wet adhesion to polypropylene film, hydrolytic stability, high melting point, and good pigment wetting.

Alcohol soluble polyamide resins have been used extensively in inks for packaging and are commercially available. These polyamides are made from dimerized fatty acids and various polyamines such as ethylene diamine or hexamethylene diamine.

The use of such polyamide resins in ink compositions is described in Floyd, D. E., *Polyamide Resins*, Reinhold Publishing Co., New York, 1958 and in the *Encyclopedia of Polymer Science and Technology*. Interscience Publishers, John Wiley Sons, Volume 10, New York, 1969. A typical commercial product is GAX-340 manufactured by Henkel.

For water based ink, a water soluble -resin such as acrylic resin or a conventional soluble maleic resin may be used. Acrylic resins have good film properties, but lack adhesion to polyolefin films.

Conventional soluble maleic resins, which contain halfesters, are subject to a certain degree of hydrolytic instability under alkaline conditions. They also lack film toughness.

It is therefore the object of this invention to provide a novel water soluble resin having qualities of adhesion, wettability and stability for use in packaging ink compositions.

SUMMARY OF THE INVENTION

The above object is met by a novel resin derived from the reaction product of modified rosin and a compound containing two secondary amine groups, including the commercial products piperazine and N,N'-dimethylethylene diamine.

DESCRIPTION OF THE PREFERRED EMBODIMENT

Rosin is mainly a mixture of $C_{20}$, fused-ring, monocarboxylic acids, typified by levopimaric and abietic acids, both of which are susceptible to numerous chemical transformations. The rosins to which this invention relates include gum rosin, wood rosin, and tall oil rosin.

It is generally known in the art that $\alpha,\beta$-unsaturated acids and their anhydrides, such as maleic acid, maleic anhydride, itaconic acid, itaconic anhydride, and fumaric acid may be reacted with abietic type rosin acids to yield $C_{24}$ polycyclic tricarboxylic acids and anhydrides. Examples include the reaction product of levopimaric acid reacted with fumaric acid, i.e., fumaropimaric acid (I) and the product of levopimaric acid reacted with maleic anhydride, i.e., maleopimaric acid anhydride (II), as described in Kirk-Othmer, *Encyclopedia of Chemical Technology*, 3rd Edition, Vol. 20, Wiley-Inter-Science Publications, John Wiley & Sons, New York, 1978:

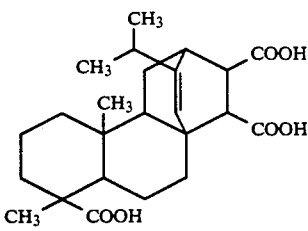

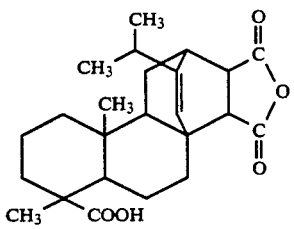

The resin of the present invention is produced by reacting such a maleated or fumarated rosin acid with a compound containing two secondary amine groups.

Generally, the polyamine may be any polyamine of the general form:

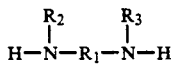

where $R_1$=alkylene and $R_2$ and $R_3$ are alkyl or where $R_1$=alkylene, $R_2+R_3$=alkylene and $R_1$, $R_2$, and $R_2$, together with the two nitrogens to which they are bonded, form a nitrogen-containing heterocyclic ring system. Preferably, the compound containing two secondary amine groups may be a linear polyamine, such as N,N'dimethylethylene diamine, or a cyclical polyamine, such as piperazine.

The nitrogens of the compound containing 2 secondary amine groups react with the secondary carboxyls of the maleated or fumarated resin to form a linear oligomer with tertiary amide groups:

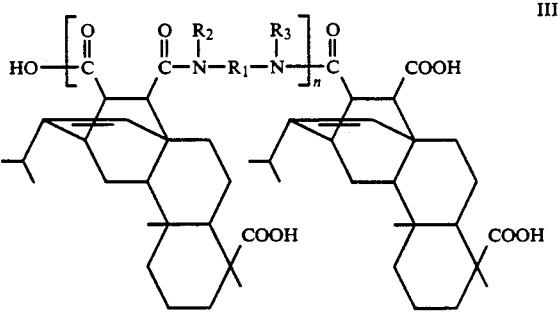

where n=a positive integer and preferably n=2 or 3.

Use of secondary amines, rather than primary amines which would react with modified rosin in a similar way, is an essential aspect of this invention because of the lower viscosity thereby obtained. A primary amine reacted with a modified rosin forms either an imide, which has greater molecular rigidity, or a secondary amide, which is subject to interchain hydrogen bonding.

The reaction should be carried out at a relatively low temperature (below about 225° C., preferably about 200° C.) so that reaction of the secondary carboxyls of the rosins is favored over the tertiary ones and to avoid chain branching. Since rosin typically cannot be fully maleated or fumarated, resin made by the above process will contain a certain amount of unreacted rosin, which acts as a plasticizer and reduces the softening point of the resin. The softening point can be increased either by using a rosin such as gum rosin that has a relatively higher content of abietic-type rosin acids and, thus, can be maleated or fumarated to a greater extent, or by using maleated or fumarated rosin that has been vacuum stripped to remove part of the unreacted rosin.

A higher softening point may also be obtained by replacing part of the maleated or fumarated rosin with a dicarboxylic acid such as adipic or isophthalic acid. The dicarboxylic acid may be any dicarboxylic acid of the general form:

HOOC—R$_4$—COOH, where R$_4$=C$_6$–C$_{12}$ alkylene, cycloalkylene or phenylene.

The resins of this invention may be used to prepare conventional water varnishes, pigment bases and water based inks.

The following examples serve to illustrate the modified rosin-bis (secondary amine) resins of the present invention:

EXAMPLE 1

An amount of eight hundred eighty-eight grams of 17.9% fumarated tall oil rosin was charged to a 2L flask fitted with a stainless steel stirrer and nitrogen sparge tube. The rosin was heated to 200° C., and 77.2g of piperazine was added slowly. The charge was held for 1 hour at 200° C., at which time the acid number was 194. The resulting resin had a Ring and Ball softening point of 142° C. and a Gardner-Holt viscosity of R-S at 35% solids in aqueous ammonia at pH 8.5.

EXAMPLE 2

A series of resins were prepared in the same manner as Example 1 with varying amounts of fumarated or maleated gum and tall oil rosin reacted with piperazine or N,N'-dimethylethylenediamine, and, in some instances, isophthalic acid, adipic acid, or succinic acid. The Ring and Ball softening point and viscosity (Gardner-Holt type) are reported in Table I below:

TABLE I

| Resin No. | Composition (Parts by wt.) | Acid No. | Grind Solution S.P., °C. (R&B) | Viscosity$^a$ Alc/H$_2$O | H$_2$O |
|---|---|---|---|---|---|
| 1 | 68.1 MTOR$^c$ 16.2 Piperazine 15.7 IPA$^c$ | 161 | 155 | P | X |
| 2 | 92.7 MGR$^c$ 7.3 Piperazine | 198 | 153 | C | F |
| 3 | 71.4 MTOR$^c$ 17.0 Piperazine 11.6 ScA$^c$ | 133 | 157 | Insol. | Insol. |
| 4$^b$ | 93.0 FGR$^c$ 7.0 Piperazine | 238–259 | 150–157 | <A | <A |
| 5 | 83.3 MTOR$^c$ 9.9 Piperazine 6.8 ScA$^c$ | 170 | 136 | Insol. | Insol. |
| 6 | 92.8 FTOR$^c$ 7.2 Piperazine | 194 | 136 | F | J |
| 7$^b$ | 92.0 FTOR$^c$ 8.0 Piperazine | 188–195 | 142–143 | F½ to H | R½ to U½ |
| 8$^b$ | 68.6 FTOR$^c$ | 167–| 152–| D to I | P to U½ |
| | 6.0 Piperazine 15.4 IPA$^c$ | 181 | 160 | | |
| 9 | 69.9 FTOR$^c$ 16.3 Piperazine 13.8 AA$^c$ | 167 | 155 | U½ | Z1 |
| 10 | 89.1 HMTOR$^c$ 10.9 Piperazine | 183 | 163 | H | X |
| 11 | 91.8 MTOR$^c$ 8.2 Piperazine | 174 | 147 | R | Z2 |
| 12 | 91.8 FTOR$^c$ 8.2 N,N'-dimethylethylene diamine | 176 | 126 | A | G |

$^a$35% solutions. (Alc/H$_2$O is 10% isopropyl alcohol in water as volatile phase.) Adjusted to pH 8.5 with ammonia.
$^b$Multiple runs of the same composition; physical properties represent the range obtained.
$^c$AA = adipic acid; FGR = 25.6% fumarated gum rosin; FTOR = 18.6% fumarated tall oil rosin; HMTOR = highly maleated tall oil rosin (vacuum stripped to remove unreacted rosin); IPA = isophthalic acid; MGR = 21.7% maleated gum rosin; MTOR = 15.7% maleated tall oil rosin; ScA = succinic acid.

In evaluating resins, high softening points are desirable because resins with high softening points increase the heat resistance of ink systems to which they are added. As shown in Table I, the highest softening point is obtained with vacuum stripped maleated rosin reacted with piperazine. Relatively high softening points are also obtained with tall oil rosin by replacing some of the fumarated or maleated rosin with a dibasic acid such as isophthalic, adipic or succinic acid (though the succinic products are insoluble)

EXAMPLE 3

Water varnishes were prepared from resin No. 7 and resin No. 8 of Example 2, above. Each resin was cut into a water varnish as follows:

| | |
|---|---|
| 35.0 | Resin |
| 3.0 | NH$_4$OH |
| 9.0 | Isopropanol |
| 50.0 | H$_2$O |
| 0.2 | Defoamer |
| 97.2 | |

Various amounts of NH$_4$OH or water were added to adjust pH to 8.4–8.7 and being the total to 100%.

The defoamer used was a non-silicone (mineral oil-based) defoamer sold under the designation Foamburst 1005 by Ross Chemical, Inc. of Fountain Inn, SC.

Properties of the varnishes were as shown in Table II:

TABLE II

| Description | Resin No. 7 Fumarated Tall Oil Rosin Piperazine | Resin No. 8 Fumarated Tall Oil Rosin Piperazine Isophthalic Acid |
|---|---|---|
| Acid Number | 195 | 181 |
| Melt Point | 142° C. | 155° C. |
| Color$^1$ | 15 | 15 |
| Viscosity$^1$ | E- | E-F |
| pH | 8.4 | 8.6 |
| appearance | clear | clear |

$^1$Gardner, 35NV water/alcohol/NH$_4$OH Varnish

These varnishes were combined with a green shade phthalocyanine blue presscake-sold by Sun Chemical of Cincinnati, Ohio, under the designation 449-5050 to make a pigment base.

| Base Formula: | 50.0 | 449-5050 |
|---|---|---|
| | 49.5 | Varnish |
| | 0.5 | Foamburst 1005 |
| | 100.0 | |

Each of the resins produced acceptable pigment dispersion, however, the flow of the base was poor. Each dispersion was very thixotropic and had no flow.

EXAMPLE 4

To evaluate working properties of the resins in inks, the bases described in Example 3 were letdown as follows:

| Ink Formula: | 50.0 | Base |
|---|---|---|
| | 25.0 | Joncryl 620[1] |
| | 5.0 | Isopropanol |
| | 15.0 | Water |
| | 5.0 | Jonwax 263[2] |
| | 100.0 | |

[1]Joncryl 620 is a flexible acrylic polymer for film printing, surface and lamination, sold by S. C. Johnson of Racine, Wisconsin.
[2]Jonwax 26 is a wax sold by S. C. Johnson of Racine, Wisconsin.

Physicals on each of the inks were as shown in Table III:

TABLE III

| | Resin No. 7 | Resin No. 8 |
|---|---|---|
| Full strength visc. Zahn 3 | >45" | >45" |
| cut 20% with 80 H2O:20 Isopropanol Zahn 3 | 18" | 18" |
| gloss[1] | 44.6 | 42.4 |
| Water resistance[2] % removal | 0% | 0% |

[1]#7 meyer bar on Printcoat board.
[2]#10 minute spot test. #7 meyer print on Printcoat board.

Each of the inks were printed with a flexo hand proofer on Mobil's LCM-W polypropylene film and treated polyethylene. Adhesion was considered good with all resins on both substrates. Compatibility was checked at a 1:1 level with both Joncryl 620 and Joncryl 61 (a flexible acrylic polymer for film printing, surface and lamination, sold by S.C. Johnson of Racine, Wisconsin). These varnish mixes were fully compatible.

When combined with the acrylic, the resins were fully compatible as evidenced by the high gloss levels. Adhesion properties of the acrylic to the polypropylene were increased by the addition of the polyamide resins. Tape adhesion and crinkle (i.e., resistance to flaking upon crinkling of a film substrate to which the ink is applied) were both very good.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

I claim:

1. A water soluble resin comprising the reaction product of (a) a rosin modified by reaction with a member of the group selected from fumaric acid, maleic acid, maleic anhydride, itaconic acid, and itaconic anhydride and (b) a compound containing two secondary amine groups.

2. The resin of claim 1 wherein the secondary amine containing compound is of the general form:

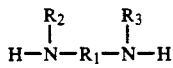

wherein $R_1$ = alkylene and $R_2$ and $R_3$ are alkyl; or where $R_1$ = alkylene, $R_2 + R_3$ = alkylene, and $R_1$, $R_2$, and $R_3$, together with the nitrogens to which they are bonded, form a nitrogencontaining heterocyclic ring system.

3. The resin of claim 1 wherein the modified rosin is derived from the group consisting of tall oil rosin, gum rosin, and wood rosin.

4. The resin of claim 1 wherein the secondary amine containing compound is selected from the group consisting of N,N'-dimethylethylene diamine and piperazine.

5. A water varnish comprising water, NH4OH, isopropanol, a defoamer, and the resin of claim 1.

6. A pigment base comprising a pigment, and the water varnish of claim 5.

7. An ink comprising an acrylic polymer, a wax, and the pigment base of claim 6.

8. The water soluble resin of claim 1 additionally comprising (c) a dicarboxylic acid of the general form:

$$HOOC-R_4-COOH$$

wherein $R_4$ = $C_6$-$C_{12}$ alkylene, cycloalkylene or phenylene.

9. The resin of claim 8 wherein the secondary amine containing compound is of the general form:

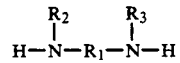

wherein $R_1$ = alkylene and $R_2$ and $R_3$ are alkyl; or wherein $R_1$ = alkylene, $R_2 + R_3$ = alkylene, and $R_1$, $R_2$, and $R_3$, together with the nitrogens to which they are bonded, form a nitrogen-containing heterocyclic ring system.

10. The resin of claim 8 wherein the modified rosin is derived from the group consisting of rosins consisting of tall oil rosin, gum rosin, and wood rosin.

11. The resin of claim 8 wherein the secondary amine containing compound is selected from the group consisting of N,N'-dimethylethylene diamine and piperazine.

12. A water varnish comprising water, NH4OH, isopropanol, a defoamer, and the resin of claim 8.

13. A pigment base comprising a pigment, and the water varnish of claim 12.

14. An ink comprising an acrylic polymer, a wax, and the pigment base of claim 13.

15. A water soluble resin comprising at least one compound of the general form:

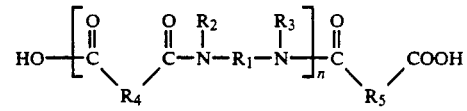

wherein $R_1$=alkylene and $R_2$ and $R_3$ are alkyl; or wherein $R_1$=alkylene, $R_2+R_3$=alkylene and $R_1$, $R_2$, and $R_3$, together with the two nitrogens to which they are bonded, form a nitrogen-containing heterocyclic ring system, where at least one $R_4$ or $R_5$ is of the general form:

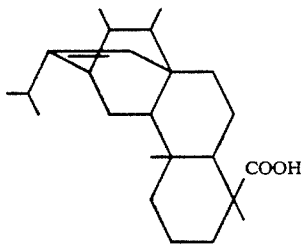

and any remaining $R_4$ or $R_5$ are independently alkylene, cycloalkylene or phenylene and wherein n=a positive integer.

16. A water varnish comprising water, NH$_4$OH, isopropanol, a defoamer, and the resin of claim 15.

17. A pigment base comprising a pigment, and the water varnish of claim 16.

18. An ink comprising an acrylic polymer, a wax, water, isopropanol, and the pigment base of claim 17.

19. The resin of claim 15 wherein n=2 or 3.

20. A water varnish comprising water, NH$_4$OH, isopropanol, a defoamer, and the resin of claim 19.

21. A pigment base comprising a pigment, and the water varnish of claim 20.

22. An ink comprising an acrylic polymer, a wax, and the pigment base of claim 21.

23. An improved water based ink formulation comprising water and a water soluble resin wherein the improvement comprises the water soluble resin comprising at least one compound of the general form:

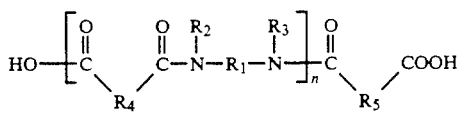

wherein $R_1$=alkylene and $R_2$ and $R_3$ are alkyl; or wherein $R_1$=alkylene, $R_2+R_3$=alkylene and $R_1$, $R_2$, and $R_3$, together with the two nitrogens to which they are bonded, form a nitrogencontaining heterocyclic ring system, where at least one $R_4$ or $R_5$ is of the general form:

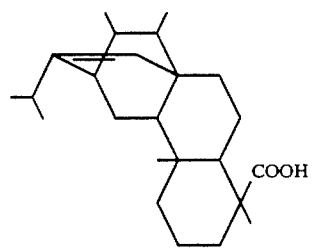

and any remaining $R_4$ or $R_5$ are independently alkylene, cycloalkylene or phenylene and wherein n=a positive integer.

24. The ink formulation of claim 23 wherein the water soluble resin is contained in a water varnish comprising water, NH$_4$OH, isopropanol, a defoamer, and the resin.

25. The ink formulation of claim 24 wherein the water varnish also contains a pigment.

26. The ink formulation of claim 25 further comprising an acrylic polymer and a wax.

27. The ink formulation of claim 23, wherein n=2 or 3.

28. The ink formulation of claim 27 which also contains the water varnish of claim 25.

29. The ink formulation of claim 28 further comprising an acrylic polymer and a wax.

* * * * *

UNITED STATES PATENT AND TRADEMARK OFFICE
CERTIFICATE OF CORRECTION

PATENT NO.   : 5,066,331
DATED        : November 19, 1991
INVENTOR(S)  : G. Frederick Hutter It is certified that errors appear in the above-identified patent and that said Letters Patent is hereby corrected as shown below:

In column 2, line 32, delete the third occurrence of "$R_2$" and substitute therefor --$R_3$--.

In column 4, line 48, delete "being" and substitute therefor --bring--.

In Claim 18, column 7, line 29, delete "water, isopropanol,".

In Claim 23, column 8, line 11, delete "nitrogencontaining" and substitute therefor --nitrogen-containing--.

Signed and Sealed this

Second Day of November, 1993

Attest:

BRUCE LEHMAN

Attesting Officer

Commissioner of Patents and Trademarks